Dec. 13, 1966     H. H. ANDREWS     3,290,748
PLASTIC SNAP FASTENERS
Filed Sept. 29, 1964
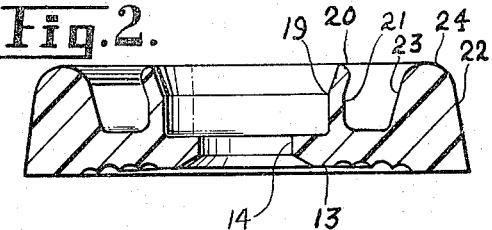
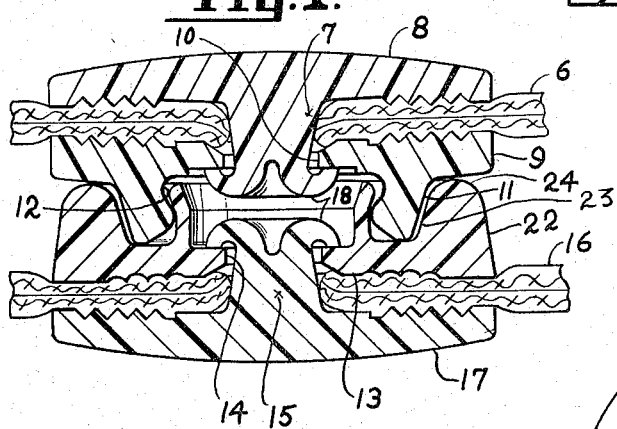
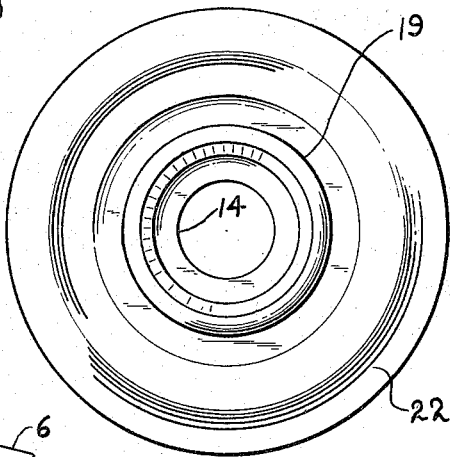
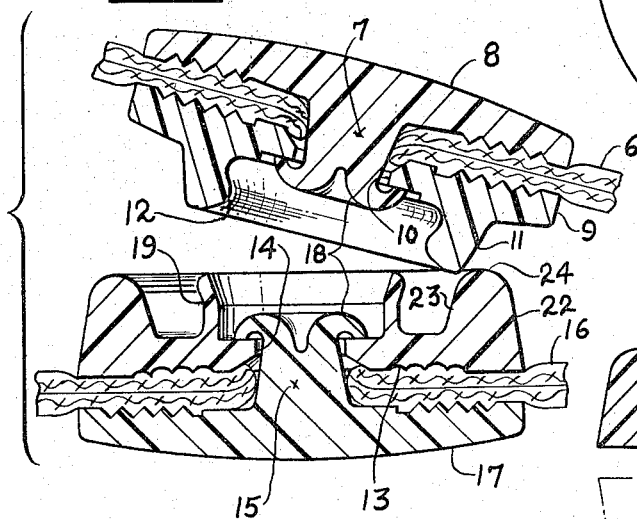
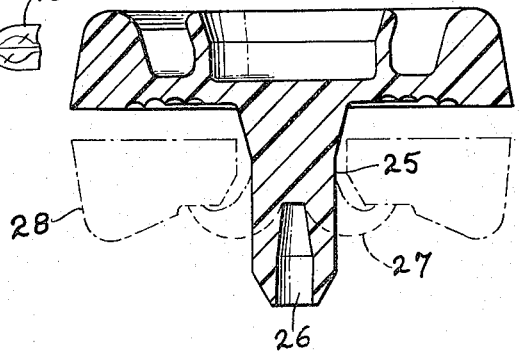

United States Patent Office 3,290,748
Patented Dec. 13, 1966

3,290,748
PLASTIC SNAP FASTENERS
Hugh H. Andrews, Cheshire, Conn., assignor to Scoville Manufacturing Company, Waterbury, Conn., a corporation of Connecticut
Filed Sept. 29, 1964, Ser. No. 400,265
2 Claims. (Cl. 24—214)

This invention is an improvement in plastic snap fasteners of the kind shown in the Huelster et al. Patent No. 3,107,408 issued October 22, 1963. The material employed in molding the parts is preferably one of the more durable thermoplastics which is rigid in the thicker sections and flexible in the thinner sections, a good example being nylon.

The object of the invention is to improve the construction of that patent without substantial additional cost of manufacture so as to extend the field of usefulness of the fastener.

The invention involves a single inexpensive expedient so constructed and so related to the other portions of the fastener that it combines three important functions to overcome problems arising in some fields of use of the Huelster et al. fastener. In practice, it was found feasible to make the stud flange much more flexible than the socket flange. The present invention involves the molding of the stud element still as one piece, but with a rigid wall surrounding the stud flange which (1) prevents flexing of the relative wide portion of the base between the narrow stud flange and the periphery of the base; (2) has an internal sloping surface rounded at the bottom edge so as to lead in the socket flange to the proper place when the parts are snapped together; (3) the wall being of substantially the same height as the stud flange, gives protection against damage as by a flat iron either from a vertical or lateral direction.

Other objects and advantages of the invention will hereinafter more fully appear.

In the accompanying drawing, I have shown for purposes of illustration, one principal embodiment and a slight modification of the attaching means which, per se, does not form a part of the invention. In the drawing:

FIG. 1 is a central vertical section through the assembled socket and stud elements;

FIG. 2 is a central section through the stud alone;

FIG. 3 is a plan view of the stud;

FIG. 4 is a sectional view indicating the action of the parts during assembling of the socket with the stud; and FIG. 5 is a modified construction of the stud indicating a different mode of assembly with a garment or the like.

The socket element is substantially the same as that of the Huelster et al. patent. It is shown mounted on a piece of cloth 6 by means of an attaching post 7 having a head 8 bearing against the outer surface of the cloth 6. The socket element itself has a circular base 9 bearing against the opposite side of the cloth, a central hole 10 through which the post 7 is engaged, and a circular socket flange 11 which is comparatively thick and rigid. This flange 11 projects downwardly from the base and has inner and outer surfaces which incline laterally inwardly as the flange projects away from the base. This provides a cavity 12 for receiving the stud, there being a constricted entrance opening to the cavity so that the stud will snap into it.

The stud element has a circular base 13 and a central opening 14 for receiving a post 15 which attaches it to the cloth 16, the cloth being gripped firmly between the base 13 and the head portion 17 of the post. The parts may be secured to the garment in each case by means of a formed head 18 on each post, as more fully described in the above Huelster et al. patent.

The stud flange 19 surrounds the opening 14 and projects upwardly from the base 13. It has a head portion 20 whose maximum diameter is somewhat greater than the entrance opening to the socket cavity 12 and a reduced neck portion 21. This flange is of comparatively thin material so as to be inwardly yieldable to permit it to snap into the socket.

The stud element is molded as one piece, with the exception of the attaching post, with a rigid wall 22 surrounding the stud flange 19. This wall is spaced from the stud flange a distance slightly greater than the thickness of the socket flange 11 so as to accommodate the socket flange loosely between the outer rigid wall 22 and the stud flange 19. This rigid wall is preferably located so as to merge smoothly with the outer edge of the stud base 13. Its inner surface 23 has a slope away from the base in a radially outward direction and the wall terminates in a rounded top corner 24. This rounded corner and sloping surface of the wall 22 will materially assist in guiding the socket flange 11 into the proper registry with the stud flange to assist in snapping the stud and socket together.

In the modification of FIG. 5, instead of a post 7 as in FIGS. 1 and 4, a stem 25 is molded on the underside of the stud element so that its hollow end 26 can be formed over to making a head 27 against a suitable eyelet 28 so as to clamp the supporting material firmly between the stud base and eyelet.

As a result of my invention, it will now be evident that with little or no additional expense, the field of usefulness of the Huelster et al. patent is materially extended. The single integral wall formed as a part of the one-piece stud molding cooperates with the base and relative fragile stud flange to accomplish the complete objectives above set forth.

What I claim is:

1. In a snap fastener having stud and socket elements consisting wholly of plastic material which is rigid in thicker sections and flexible in thinner sections, the stud element having a circular base and an upstanding circular stud flange, the socket element also having a base and a circular flange projecting therefrom providing a constricted entrance opening for snap engagement with said stud flange; the improvement which consists of a rigid wall integral with the stud base and surrounding said stud flange in such spaced relation as to loosely accommodate said socket flange between said wall and stud flange, said wall being substantially heavier in cross-section than said stud flange and of substantially the same height, the inner surface of said rigid wall having a slope in an upward and radially outward direction so as to guide the socket flange during assembly of the socket with the stud.

2. In a snap fastener, the improvement defined in claim 1 characterized further by the rigid wall being located around the periphery of the stud base with the outer surface of said wall merging smoothly with the outer edge of the stud base.

References Cited by the Examiner

UNITED STATES PATENTS

| 665,938 | 1/1901 | Schonbach | 24—214 |
|---|---|---|---|
| 2,249,896 | 7/1941 | Hall | 24—208 |

FOREIGN PATENTS 203,121   10/1908   Germany.

WILLIAM FELDMAN, *Primary Examiner.*

E. SINONSEN, *Assistant Examiner.*